Patented Aug. 3, 1948

2,446,382

UNITED STATES PATENT OFFICE 2,446,382

2-FLUORO-1,3-DIENE POLYMERS

Walter E. Mochel, Wilmington, Del., assignor to E. I. du Pont de Nemours & Company, Wilmington, Del., a corporation of Delaware No Drawing. Application May 20, 1944, Serial No. 536,613

2 Claims. (Cl. 260—92.7)

This invention relates to new, improved rubber-like polymers and the process for preparing the same. More particularly, it relates to improved polymers of fluoroprene (2-fluoro-1,3-butadiene).

In the manufacture of synthetic rubbers by polymerization of conjugated dienes, it is standard practice to include with the polymerizable monomers small proportions of certain modifying agents in order to obtain products which are sufficiently plastic to permit satisfactory processing with conventional rubber equipment. Sulfur or sulfur containing compounds, normally employed with butadiene or chloroprene for this purpose, are also effective as fluoroprene polymer modifiers, but with the latter diene in particular there is a need for developing methods by which still further improvements in plasticity and mill behavior of the products can be realized.

It is therefore the object of the present invention to provide rubber-like fluoroprene polymers and copolymers of improved plasticity and better processing characteristics. A further object is to provide a more economical process for preparing synthetic rubbers based on fluoroprene.

These objects have been accomplished by the polymerization to rubber-like products of fluoroprene monomer or mixtures of fluoroprene with other polymerizable materials in the presence of 0.5% to 5% of 2,2-difluorobutene-3.

Fluoroprene, or a mixture of fluoroprene with other polymerizable unsaturated compounds and 0.5% to 5% of 2,2-difluorobutene-3 (based on polymerizable monomers), is dispersed in an aqueous system containing an emulsifying agent and a polymerization catalyst, preferably of the persulfate or peroxide type. In most instances, it is preferable to include a sulfur containing modifying agent. The emulsion of monomers so obtained is polymerized at a temperature preferably in the range of 20° to 40° C. The resulting latex, after being stabilized with an antioxidant such as phenyl-alpha-naphthylamine, is coagulated, and the rubber-like coagulum is masticated and washed free of residual salts on a corrugated rubber mill, and is finally dried by milling on a smooth rubber mill. The resulting coherent, plastic material is then compounded, molded, and vulcanized.

The 2,2-difluorobutene-3 can be prepared by the vapor phase reaction of monovinylacetylene with two mols of hydrogen fluoride and, in fact, it is normally obtained as a by-product in the vapor phase preparation of fluoroprene itself, as described in copending applications of Coffman and Salisbury Serial No. 508,242, filed October 29, 1943, Salisbury Serial No. 508,243, now Patent No. 2,426,792, filed October 29, 1943, and Barney Serial No. 517,837, filed January 11, 1944. Consequently, it is advantageous to use a fluoroprene monomer from which the 2,2-difluorobutene-3 has not been removed. Thus, the use of 2,2-difluorobutene-3 not only aids in preparing more plastic, readily processable fluoroprene polymers, but it also simplifies the purification of the monomer. It is preferable to use fluoroprene which is substantially free of monovinylacetylene and essentially free of peroxides.

The following examples are given to illustrate the invention. The parts used are by weight.

EXAMPLE 1

A mixture of 100 parts by weight of fluoroprene and 2 parts of 2,2-difluorobutene-3, emulsified in 157 parts of an aqueous solution containing 4 parts of sodium oleate, 0.5 part of excess sodium hydroxide, 1 part of formaldehyde/sodium naphthalenesulfonate condensation product, 1 part of potassium persulfate, and 0.1 part of potassium ferricyanide. Three-tenths part of lauryl mercaptan is added, and the emulsion is heated for 5½ hours at 30° C. in a sealed glass-lined vessel equipped for efficient agitation. The resulting latex is treated with 2 parts of a phenyl-alpha-naphthylamine-diphenylamine (55:45) mixture dispersed in water. The stabilized latex is coagulated by means of brine and acetic acid, masticated and washed free of residual salts on a corrugated rubber mill, and finally dried on a smooth mill at an elevated temperature. The product consists of a coherent rubber-like material which is more plastic and better milling than polyfluoroprene prepared similarly except for the absence of 2,2-difluorobutene-3. The dried polymer is compounded according to the following formula.

*Formula*

| | Parts |
|---|---|
| Polymer | 100 |
| Channel carbon black | 40 |
| Stearic acid | 1 |
| Extra light calcined magnesia | 10 |
| Zinc oxide | 10 |
| Phenyl-alpha-naphthylamine | 1 |
| Sulfur | 2 |

The compounded stock is pressed to the desired shape in a mold and cured for 60 minutes at 153° C. under pressure. The vulcanizate has a tensile strength of 2610 p. s. i. at 310% elongation, and good oil resistance as indicated by a volume increase of only 76% after 2 days in kerosene at 100° C. The vulcanizate is further characterized by good resilience, as indicated by Schopper rebound of 40%, and much better sunlight and ozone resistance than natural rubber. Its freeze resistance is particularly outstanding, as indicated by a $T_{10}$ value—52° C. and $T_{50}=-41°$ C. The $T_{50}$ test, used as a measure of freeze resistance, is carried out as follows: A vulcanizate of uniform cross-section is stretched at least 170% and cooled slowly to $-70°$ C. In this stretched condition. The tension on the sample is then released, the temperature is raised slowly, and the sample is allowed to contract freely. The temperatures at which the sample shows 10% and 50% of the total retraction possible are the $T_{10}$ and $T_{50}$ value, respectively. Thus, the lower the $T_{10}$ and $T_{50}$ values, the greater is the freeze resistance.)

When fluoroprene is polymerized in the presence of smaller amounts of 2,2-difluorobutene-3, the improvement in plasticity, as to be expected, is somewhat less. A mixture containing 100 parts of fluoroprene and 0.1 part of 2,2-difluorobutene-3, for example, when polymerized as described above, gives a coherent, rubbery product which also has better tack than polyfluoroprene prepared in the absence of the difluorobutene and can be processed more readily on conventional rubber mills. Greater improvement in plasticity may be obtained by the use of larger amounts of 2,2-difluorobutene-3. With 5% of the latter, a plastic, coherent product is obtained in 97% yield which gives a vulcanizate showing a tensile strength of 2980 lbs. per sq. in. at 380% elongation.

EXAMPLE 2

A mixture of 100 parts of fluoroprene and 2 parts of 2,2-difluorobutene-3 is emulsified in 157 parts of an aqueous sodium oleate solution as described in Example 1, but without the mercaptan modifier. This emulsion is heated for six hours at 30° C. in a sealed glass-lined vessel. The resulting latex is stabilized with 2 parts of antioxidant consisting of phenyl-alpha-naphthylamine/diphenylamine (55:45) added as a 50% dispersion in water. The latex is then coagulated with acetic acid and brine and the coagulum is washed and dried as before. The product consists of 50 parts of a coherent rubbery material which is more plastic and easier to process than polyfluoroprene prepared in the absence of the difluorobutene and a sulfur containing modifier.

EXAMPLE 3

A mixture of 85 parts of fluoroprene, 15 parts of acrylonitrile, and 2 parts of 2,2-difluorobutene-3 is emulsified in 157 parts of an aqueous solution containing 4 parts of sodium oleate, 0.5 part of sodium hydroxide, 1 part of formaldehyde/sodium naphthalenesulfonate condensation product and 1 part of potassium persulfate. One and one-quarter parts of lauryl mercaptan is added, and the emulsion is heated seven hours at 40° C. in a sealed glass-lined vessel equipped for efficient agitation. The latex is stabilized and coagulated, as described in Example 1. The coagulum is then washed and dried to obtain a quantitative yield of coherent rubbery material which mills better than a similar polymer prepared in the absence of 2,2-difluorobutene-3.

This rubber is compounded according to Formula I and vulcanized for thirty minutes at 141° C. to yield a tough elastic product having excellent oil resistance as indicated by only 27% volume increase after two days' immersion in kerosene at 100° C.

EXAMPLE 4

A mixture of 90 parts of fluoroprene, 10 parts of styrene, and 2 parts of 2,2-difluorobutene-3 is emulsified in 157 parts of the aqueous solution described in Example 3. Three-tenths part of lauryl mercaptan is added, and the emulsion is heated twelve hours at 40° C. The resulting latex is stabilized and coagulated, and the coagulum is washed and dried to a quantitative yield of plastic, coherent rubber which can be processed readily on conventional rubber equipment. Vulcanizates, prepared as described in Example 1, have a tensile strength of 3240 lbs. per sq. in. at 500% elongation and good rebound (42%).

It is to be understood that the examples are illustrative only, and that any amount of 2,2-difluorobutene-3 within the limits of 0.05% to 5%, based on the weight of polymerizables, can be employed. At least 0.05% of the 2,2-difluorobutene-3 is required to obtain significant improvements in mill behavior, and, if more than about 5% of the butene compound is used, the tensile strength of the resulting product may be impaired and the tackiness of the product may become excessive.

It is preferable in using fluoroprene prepared from monovinylacetylene and hydrogen fluoride that the monomer be essentially free of peroxides and acetylenic compounds, although attractive polymers from somewhat less pure fluoroprene may be prepared by the proper adjustment of sulfur containing modifiers. Thus, if the fluoroprene contains an appreciable amount of monovinylacetylene, the use of an increased proportion of such a modifier in the polymerization will tend to overcome the deleterious effects of the acetylenic compounds upon the properties of the rubber. While the examples illustrate only the preparation of improved polymers of 2-fluorobutadiene-1,3, it is to be understood that the invention is applicable likewise to polymerizable fluoroprene homologs such as 2-fluoro-3-methylbutadiene-1,3, 2-fluoro-3-ethylbutadiene-1,3, or 2-fluoro-3-propylbutadiene-1,3.

While the benefits derived from the use of difluorobutene are most pronounced in polymerizations with fluoroprene itself, as illustrated in the examples the invention is applicable to the preparation of improved copolymers of fluoroprene with other polymerizable organic compounds. Other polymerizable compounds which may be employed include styrene, acrylonitrile, vinylidene chloride, esters of acrylic and methacrylic acids, such as butyl acrylate and methyl methacrylate, vinylethinyl carbinols, e. g., dimethyl(vinylethinyl) carbinol, methyl vinyl ketone, butyl vinyl sulfone, vinyl pyridine, diisobutyl fumarate, N-n-butyl-maleic imide and 1,3-dienes, such as butadiene, isoprene and chloroprene. The preferred polymerizable unsaturated compounds are those which contain a terminal methylene group, as in the $CH_2=C$ group, because, in general, they copolymerize more readily with fluoroprene to produce synthetic rubber-like materials having good oil and freeze resistance. Elastomers having greater oil resistance are obtained when monomer mixtures containing at least 25% and preferably more than 50% of fluoroprene are employed. This invention can be used to prepare synthetic rubber-like materials from mixtures containing more than two polymerizable monomers, such as mixtures of fluoroprene, butadiene and acrylonitrile; fluoroprene, butadiene and dimethyl (vinylethinyl) carbinol; and fluoroprene, dimethyl-(vinylethinyl) carbinol and acrylonitrile. To obtain multicomponent elastomers having improved oil and freeze resistance, the total diene content is preferably at least 50%, of which at least 50% is fluoroprene.

The monomer mixture may be polymerized in any convenient manner. Good results are obtained by using the emulsion polymerization technique. Although the alkaline sodium oleate system, as described in the examples, is generally preferred, other emulsifying agents may be used in either alkaline or acid media with good results, such as the alkali salts of naphthenic acids, long chain aliphatic sulfonic acids, or alkyl naphthalene-sulfonic acids, etc. Betaines such as C-cetyl or N-hydroxy-propyl-C-cetyl-betaine and quaternary ammonium salts having long carbon chains, such as cetyltrimethyl-ammonium bromide, may likewise be used, and combinations of emulsifying agents such as the alkali salts of oleic acid and rosin may also be employed to advantage. It is possible to carry out the polymerizations under many diverse conditions and in the presence of many different ingredients commonly used for the modification of haloprene or butadiene hydrocarbon polymerization systems.

As the polymerization catalyst potassium persulfate is preferred, although other materials, such as hydrogen peroxide, benzoyl peroxide, or sodium perborate may be used if desired. Catalyst activators, such as potassium ferricyanide or sodium hydrosulfite used in conjunction with persulfates or peroxides, are especially beneficial by way of accelerating polymerizations.

Polymerization modifiers, such as octyl, decyl, or lauryl mercaptans or crude mixtures of long chain aliphatic mercaptans are preferably employed. However, other polymerization modifiers, such as sulfur, dialkyl xanthogen disulfides or carbon tetrachloride, may be used if desired.

The polymerization temperature may be varied within the limits of 5° to 80° C., temperatures of 20° to 40° C. being preferred. The time required to obtain high yields of polymerizate will vary, of course, with the temperature, the catalyst, and the emulsion system employed.

The polymerized latex may be stabilized in any suitable manner. The addition of a dispersion of an aromatic amine such as phenyl-alpha-naphthylamine, is a preferred method. It is also possible to add the stabilizer to the coagulum on a rubber mill. The latex may be coagulated by alcohol, acids, and brine, or by heavy metal salts such as aluminum sulfate, or by freezing, as described in U. S. Patent 2,187,146. The use of brine and an acid such as acetic or sulfuric acid is preferred for the coagulation of sodium oleate latices. Processing of the coagulum can be carried out by conventional means.

The polymerization product prepared as described above may be compounded in many different ways in order to obtain vulcanizates having different properties desired for specific uses. In general, the well-known techniques of compounding rubber and butadiene copolymer rubbers with sulfur, a vulcanization accelerator, and a metallic oxide, are applicable to these products. The compounded mass may then be molded, sheeted, calendered, or, in general, formed to the desired shape and vulcanized. The vulcanization may be carried out at room temperature or above, but preferably between 130° C. and 170° C.

The products of this invention are especially valuable in applications where materials which retain their rubber-like characteristics at low temperatures, or in contact with oils or other chemicals, are required. Furthermore, they are particularly valuable for applications where ozone and sunlight resistance are required in addition to oil and freeze resistance. Specific applications requiring one or more of these properties are encountered in certain automobile and airplane parts, such as carburetor or fuel pump diaphragms, gaskets, motor mounts, gasoline hose, airplane door seals, and the like.

I claim:

1. A synthetic rubber-like material of the class consisting of homopolymers of a polymerizable 2-fluoro-1,3-diene and copolymers of the same with unsaturated compounds containing the terminal grouping $CH_2=C<$ which are polymerizable therewith in aqueous emulsions and from monomer mixtures containing at least 50% of the 2-fluoro-1,3-diene, which polymers have been obtained by emulsion polymerization of the monomers in the presence of from 0.5% to 5.0% of 2,2-difluorobutene-3, based on the weight of the polymerizable monomers.

2. A synthetic rubber-like homopolymer of fluoroprene which has been obtained by emulsion polymerization of the fluoroprene in the presence of from 0.5% to 5.0% of 2,2-difluorobutene-3, based on the weight of the fluoroprene.

WALTER E. MOCHEL.

REFERENCES CITED

The following references are of record in the file of this patent:

UNITED STATES PATENTS

| Number | Name | Date |
|---|---|---|
| 1,950,431 | Carothers et al. | Mar. 13, 1934 |
| 2,066,330 | Carothers et al. | Jan. 5, 1937 |